US007725833B2

(12) United States Patent
Lim et al.

(10) Patent No.: US 7,725,833 B2
(45) Date of Patent: May 25, 2010

(54) COMMUNITY PROVIDING SYSTEM, COMMUNITY PROVIDING METHOD AND COMPUTER READABLE STORAGE MEDIUM STORING EXECUTION PROGRAM FOR THAT METHOD

(75) Inventors: Sam-Yeol Lim, Gyeonggi-do (KR); Hyeon-Jeong Ahn, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 196 days.

(21) Appl. No.: 11/573,195

(22) PCT Filed: Aug. 1, 2005

(86) PCT No.: PCT/KR2005/002510

§ 371 (c)(1), (2), (4) Date: Feb. 2, 2007

(87) PCT Pub. No.: WO2006/014066

PCT Pub. Date: Feb. 9, 2006

(65) Prior Publication Data

US 2007/0198531 A1 Aug. 23, 2007

(30) Foreign Application Priority Data

Aug. 2, 2004 (KR) ...................... 10-2004-0060956

(51) Int. Cl.
*G06F 3/00* (2006.01)

(52) U.S. Cl. ....................................... 715/745; 709/224

(58) Field of Classification Search ................... 707/10; 715/234, 235, 236, 249, 255, 745
See application file for complete search history.

(56) References Cited

U.S. PATENT DOCUMENTS 6,249,795 B1 * 6/2001 Douglis ...................... 715/210

(Continued)

FOREIGN PATENT DOCUMENTS

KR 2001-0091448 10/2001

(Continued)

OTHER PUBLICATIONS

English language abstract of Korean Publication No. 2002-003920.

(Continued)

*Primary Examiner*—Mohammad Ali
*Assistant Examiner*—Angelica Ruiz
(74) *Attorney, Agent, or Firm*—H.C. Park & Associates, PLC

(57) ABSTRACT

Disclosed are a community providing system, a community providing method, and a computer-readable recording medium for storing a program capable of carrying out the method. In one embodiment, community configuration items including at least one of a template and a background image of a community are provided, and corresponding URL information is sorted and stored for each user when the user specifies a desired community configuration item. A community environment to which the requested community configuration item is applied is provided after receiving the URL information on the requested community configuration item according to the request made by the user. Therefore, system usage may be increased because of the provision of various community environments where the user can show his personality through the establishment of various environments.

10 Claims, 9 Drawing Sheets

U.S. PATENT DOCUMENTS

| | | | | |
|---|---|---|---|---|
| 6,510,439 | B1 * | 1/2003 | Rangarajan et al. | 707/201 |
| 7,404,141 | B1 * | 7/2008 | Giljum et al. | 715/234 |
| 2001/0050681 | A1 * | 12/2001 | Keys et al. | 345/418 |
| 2003/0115267 | A1 * | 6/2003 | Hinton et al. | 709/204 |
| 2004/0199767 | A1 * | 10/2004 | Gross | 713/168 |
| 2006/0004914 | A1 * | 1/2006 | Kelly et al. | 709/219 |

FOREIGN PATENT DOCUMENTS

| | | |
|---|---|---|
| KR | 2002-0014039 | 2/2002 |
| KR | 2003-0011442 | 2/2003 |

OTHER PUBLICATIONS

English language abstract of Korean Publication No. 2003-0017043.

English language abstract of Japanese Publication No. 2002-082880.

* cited by examiner

COMMUNITY PROVIDING SYSTEM, COMMUNITY PROVIDING METHOD AND COMPUTER READABLE STORAGE MEDIUM STORING EXECUTION PROGRAM FOR THAT METHOD

CROSS-REFERENCE TO RELATED APPLICATION

This application is a U.S. national phase application of PCT International Application No. PCT/KR2005/002510, filed Aug. 1, 2005, which claims priority of Korean Patent Application No. 2004-0060956, filed Aug. 2, 2004, the contents of which are incorporated herein by reference in their entirety.

TECHNICAL FIELD

The present invention relates to a community providing system and a community providing method. More specifically, the present invention relates to a community providing system and a community providing method for providing a community environment to a plurality of user terminals connected through a network.

BACKGROUND

A community service represents a service provided on the Internet by an Internet service provider, and provides environments in which various online users can present themselves and communicate with other users. Recent community services include cafes, blogs, bulletin boards, and web-zines.

As the number of community service providers and community services users has increased, some users have indicated a desire to receive additional or distinctive services that may be different from the normal services. That is, the same uniform community environments, for example, title areas, post areas, link areas, and archive areas in the case of blogs have been generally provided to owners of blogs, without considering the individual needs of the blog owners.

If necessary, community-setting environments can be changed by modifying the whole background image of the community or setting predetermined decoration items. However, the above-described modification by the user setting process modifies only a very small part of the whole community environmental setting, and it generates effects of decorating given areas or changing background images without changing the whole layout of the community environment.

Therefore, the conventional art restricts differences between the communities, which may degrade users' interest in visiting sites and communicating with various communities, thereby reducing improvements of service usage.

SUMMARY

It is an advantage of the present invention to provide a distinctive community environment to various users through changes of community environmental layouts.

It is another advantage of the present invention to provide a community environment selected and set by the user.

As a result, one advantage of the present invention is to provide a distinctive community environment for increasing usage of community services.

In one embodiment of the present invention, a community providing system for providing a community environment to user terminals connected through a network includes a goods server for storing community configuration items including at least one of a template and a background image of a community, an item shop server for specifying community configuration items, an item database for sorting and storing URL information on specified community configuration items for respective users, a bridge server for delivering URL information on the requested community configuration item from the item database when a user terminal requests the bridge server to apply a specified community configuration item, and a community server for generating a community web page to which the requested community configuration item is applied and providing the community web page to the user terminal based on the URL information on the community configuration item delivered by the bridge server.

The community server may further provide a cookie including URL information on the community configuration item to the user terminal, and provide a community environment based on the URL information on the community configuration item stored in the cookie when the user terminal in an access state has the cookie.

The community server may also delete the cookie stored in the user terminal and again receive URL information on the community configuration item from the bridge server depending on conditions.

The cookie may further comprise cookie expiration period information, and the community server may again receive URL information on the community configuration item from the bridge server when the cookie expiration period is passed.

In another embodiment of the present invention, a community providing method for providing a community environment to user terminals connected through a network includes storing community configuration items including a template and a background image of a community, specifying the community configuration item, sorting and storing URL information on the specified community configuration item for respective users, delivering URL information on the requested community configuration item when a request to apply the specified community configuration item is provided by a user terminal, and generating and providing a community web page to which the requested community configuration item is applied based on URL information on the delivered community configuration item.

DETAILED DESCRIPTION

Figure 1:
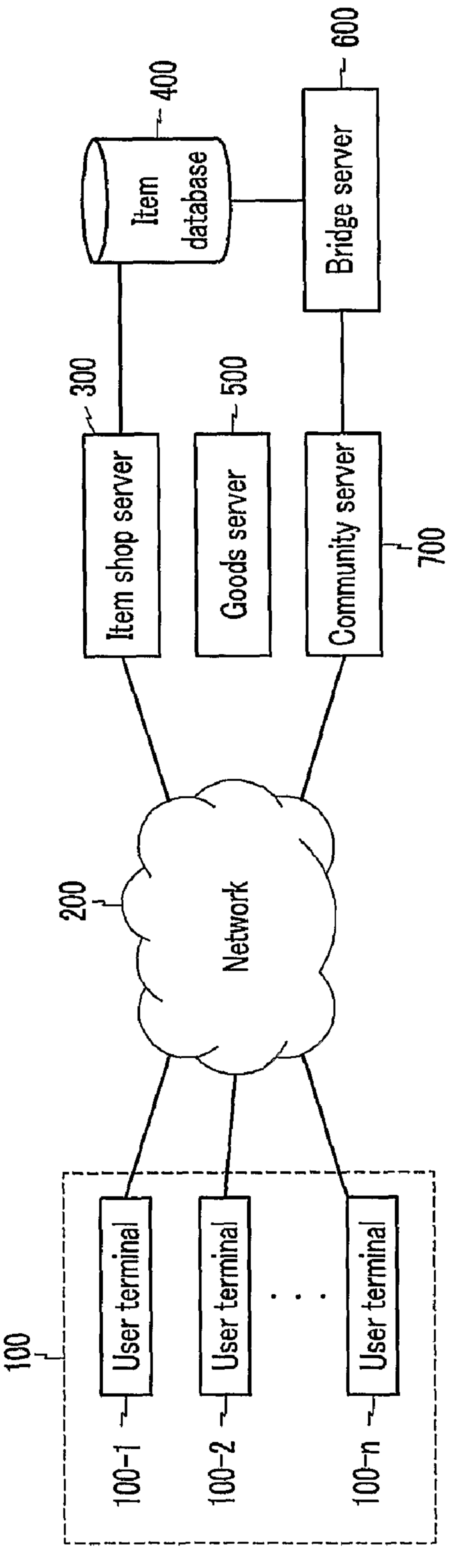
FIG. 1 shows a schematic representation of a system configuration according to an embodiment of the present invention.

In the following detailed description, embodiments of the invention have been shown and described by way of illustration. However, the invention is capable of modification in various respects, all without departing from the invention. Accordingly, the drawings and description are to be regarded as illustrative in nature, and not restrictive. To clarify the present invention, various parts which may be well known in the art are not described in the specification, and parts for which similar descriptions are provided have the same reference numerals.

As shown in FIG. 1, the community providing system according to an embodiment of the present invention is connected to a plurality of user terminals 100-1, 100-2, . . . , 100-*n* (which will all be referred to with the reference numeral of 100) through the network, and includes an item shop server 300, an item database 400, a bridge server 600, a goods server 500, and a community server 700.

The user terminal 100 is a communication terminal for accessing the community providing system through the network 200, and may include a variety of communication services, for example, a mobile terminal, a computer, and an Internet TV.

The goods server 500 stores community configuration items including at least one template and one background image of a community.

The template of the community represents information on the configuration with which the documents finally output to the user are displayed to the screen of the user terminal 100. Also, the background image of the community represents information on the image that is applied to the whole community environment and is then displayed.

The goods server 500 stores at least one community template and background image, and can be generally configured such that the template and the background image can be added or deleted by a system manager.

Also, the goods server 500 can store various community configuration items for configuring other new community environments in addition to the template and the background image.

The item shop server 300 specifies community configuration items to be used. The specification of community configuration items can be configured in an item-buying format, and although it is not restricted only to the case of buying. The item shop server 300 presents various community configuration items that are stored in the goods server 500 and can be purchased by users. To accomplish this, the user may access the item shop server 300 and may buy a template and a background image to be used for the user's community environment configuration.

In this instance, the template and the background image can be individually presented so that the user may separately buy the template and the background image, or they can be presented in pairs so that the user may buy a specific template and a corresponding background image in a package.

The item database 400 stores URL information on the specific community configuration items bought by respective users from the item shop server 300 according to the respective users. In this instance, when a single user buys a plurality of community configuration items, for example a template and a background image, the item database 400 stores respective URL information on the template and the background image according to the purchasing user.

Therefore, the item database 400 stores information on the user community configuration items according to users, where each user can be associated with a plurality of community configuration item information.

In this instance, the URL information on the community configuration items represents information that indicates the real locations at which the item files such as the template and background image are stored, and the goods server 500 that pre-stores and manages the community configuration items can indicate the storage locations of respective files. In addition, if needed, the same server can indicate the storage locations of files when the community configuration items are duplicated and stored in another server.

For example, the image for configuring the community environment can be stored in the goods server 500, and the template can be duplicated from the goods server 500 and be stored in the community server 700. In this instance, the URL information on the template file may be the storage location of the template file in the community server 700, and the URL information on the background image may be the storage location of the background image file in the goods server 500.

When receiving a request to apply a specified community configuration item from the user terminal, the bridge server 600 receives URL information on the requested community configuration item from the item database 400 and transmits the URL information to the community server 700. That is, when receiving a request from the community server 700, the bridge server 600 receives URL information on the requested specific community configuration item from the item database 400.

The community server 700 provides a community environment to which the community configuration item requested based on the URL information on the community configuration item transmitted from the bridge server 600 is applied.

That is, when the user accesses the community server 700 and requests application of the specific template and the background image bought by the user for the community environment, the community server 700 seeks URL information on the corresponding template and the background image from the bridge server 600, generates a community web page configured with the corresponding template and the background image based on the URL information on the template and the background image transmitted by the bridge server 600, and provides the community web page to the user terminal.

For example, as shown in FIG. 2 to FIG. 7, when the community server 700 is a blog server, the goods server 500 stores various templates to be used for the configuration of blogs.

Figure 2:
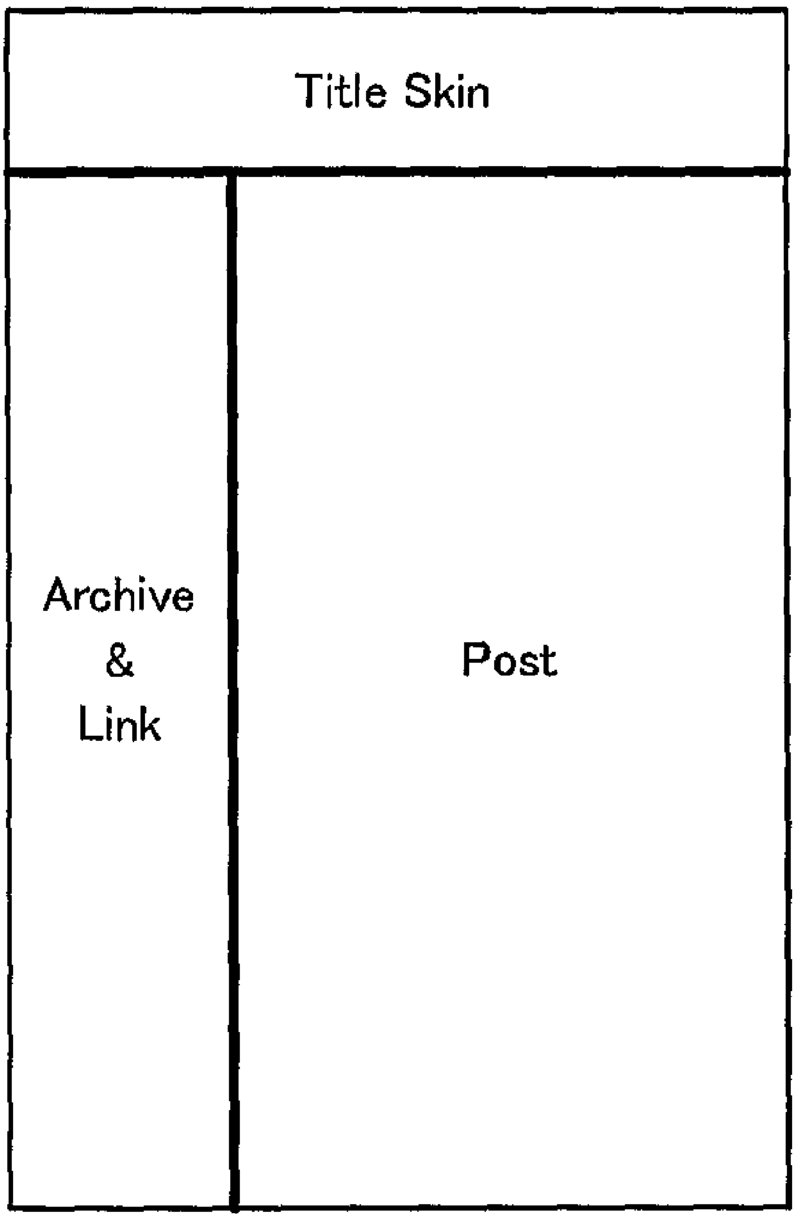
FIG. 2 to FIG. 7 show various exemplary templates applied to the community environment configuration.
Figure 3:
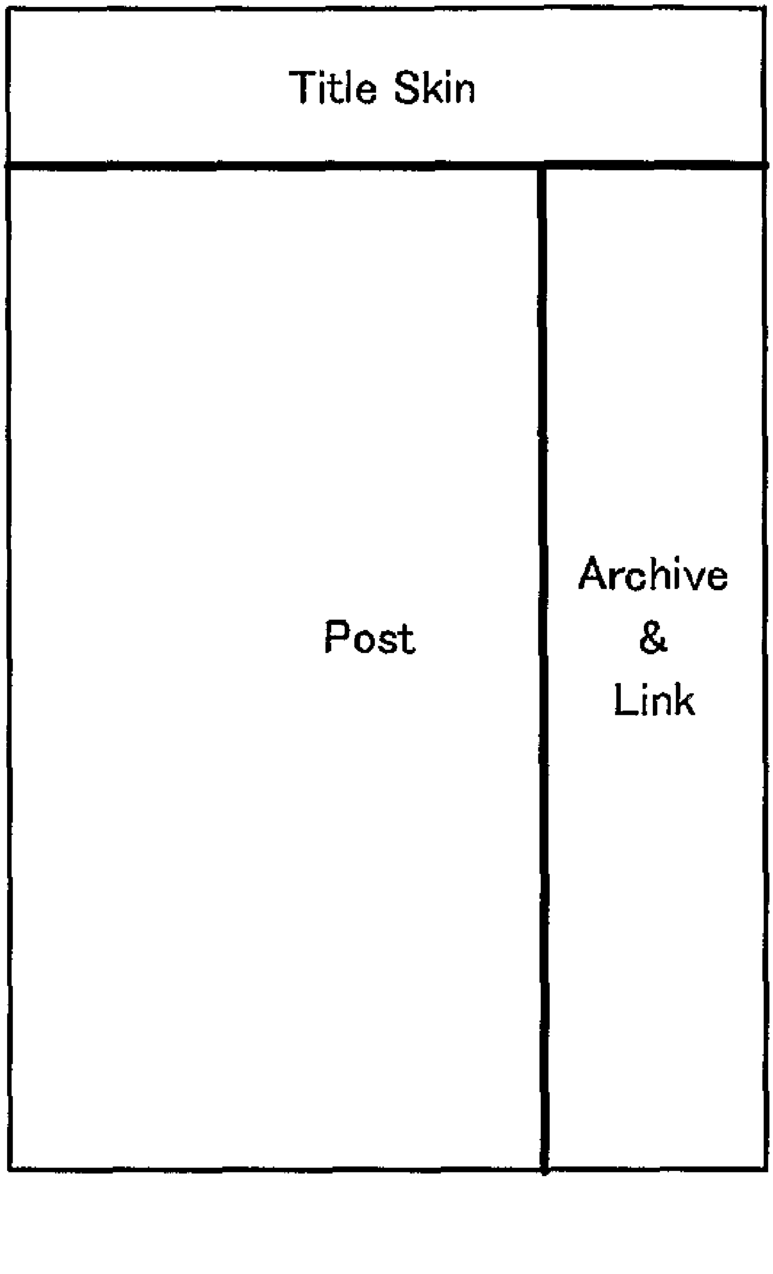

In the case of the two-column and left template shown in FIG. 2, the blog screen provided to the user terminal 100 is divided into two columns except for the top title area, where the left column is assigned as an area of various links and archives, and the right column is assigned as an area of posts.

In this instance, the archives represent documents generated in the past, and the documents from the past are provided in the format of calendars or monthly lists. Also, the posts indicate articles written in the blog sites that correspond to posted articles on the bulletin board, and may indicate all writings uploaded to the blog, documents, posted articles, and data. In the case of the two-column and right template shown in FIG. 3, the blog screen is divided into two columns except for the top title area, where the left column is assigned as an area for posts, and the right column is assigned as an area for various links and archives.

Figure 4:
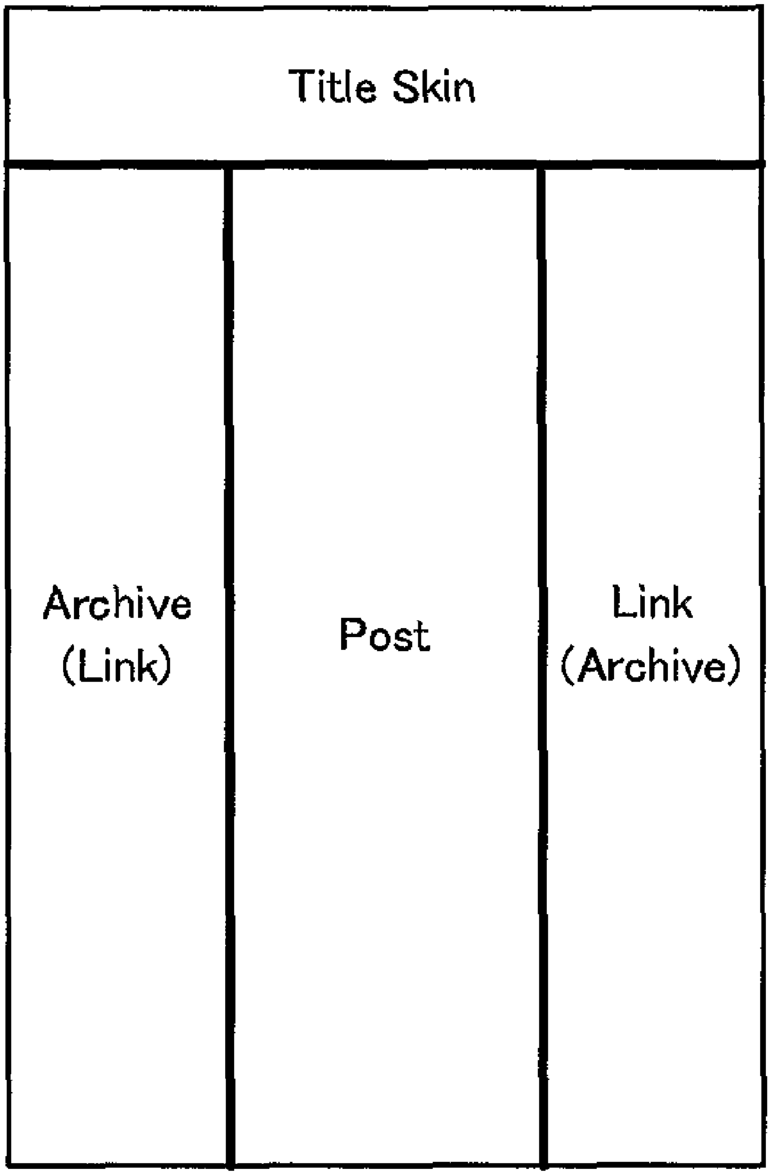

Also, in the case of the three-column template shown in FIG. 4, the blog screen is divided into three columns except for the top title area, where one of the left and right columns is assigned as an area for archives, the other column is assigned as an area for links, and the central column is assigned as an area for posts.

Figure 5:
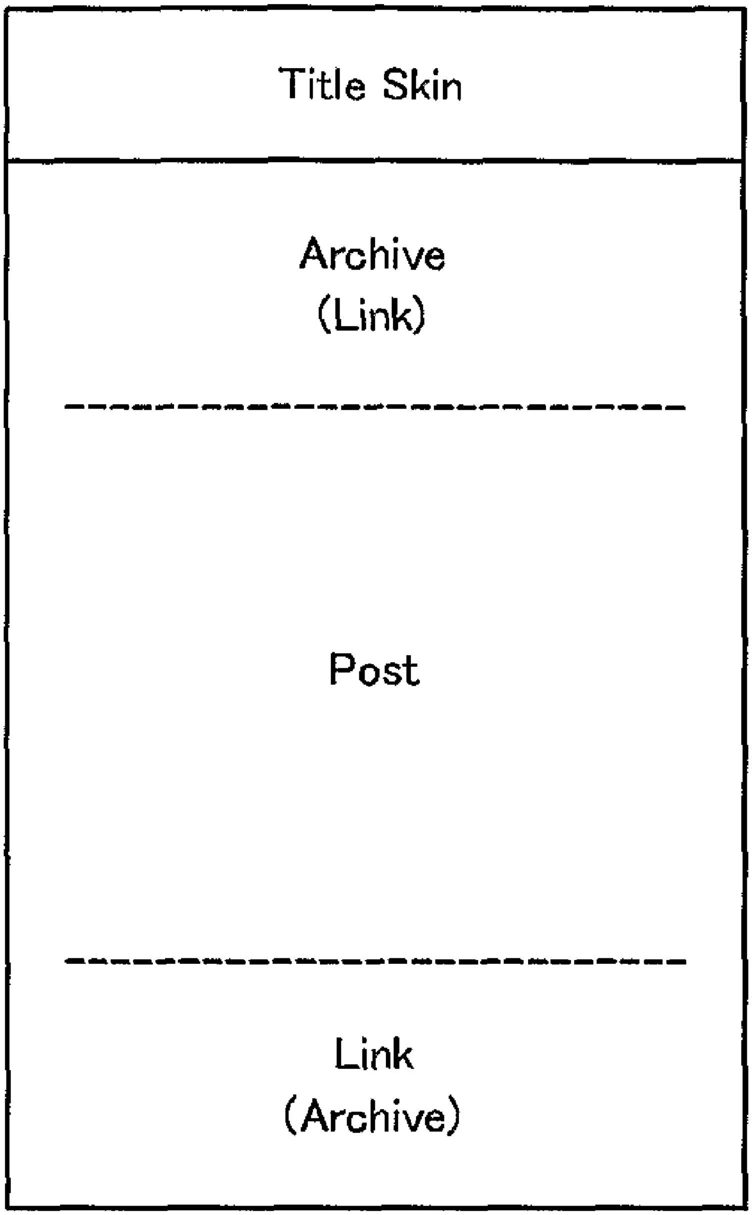

In addition, in the case of a vertical single-column template shown in FIG. 5, the blog screen has a single page except for the top title area, where the archive and link menus are minimized, and most of the page is provided for posting contents. Therefore, one of the archive and link menus can be positioned at the top of the screen and the other one at the bottom thereof, or they may both be positioned at one of the top and the bottom.

Figure 6:
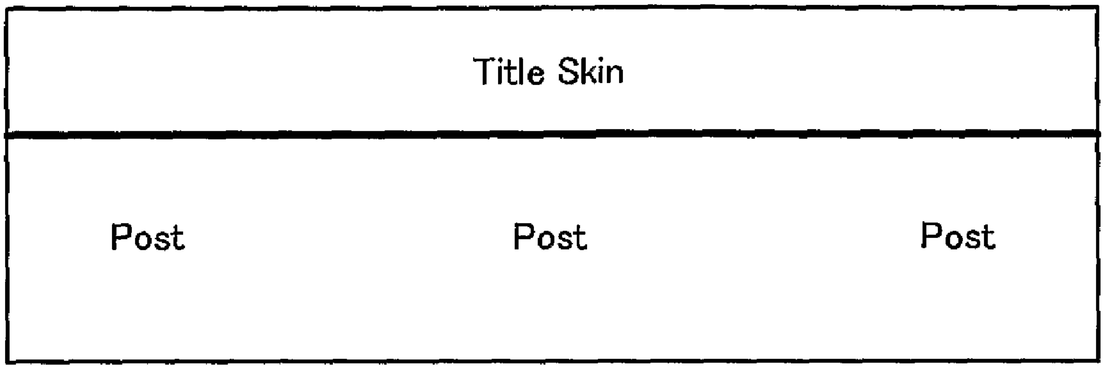

Further, in the case of the horizontal one-column template shown in FIG. 6, the user scrolls the screen in the horizontal direction to read posts while fixing the vertical length of the blog screen. In this instance, the archive and link menu components are applicable in various manners.

Figure 7:
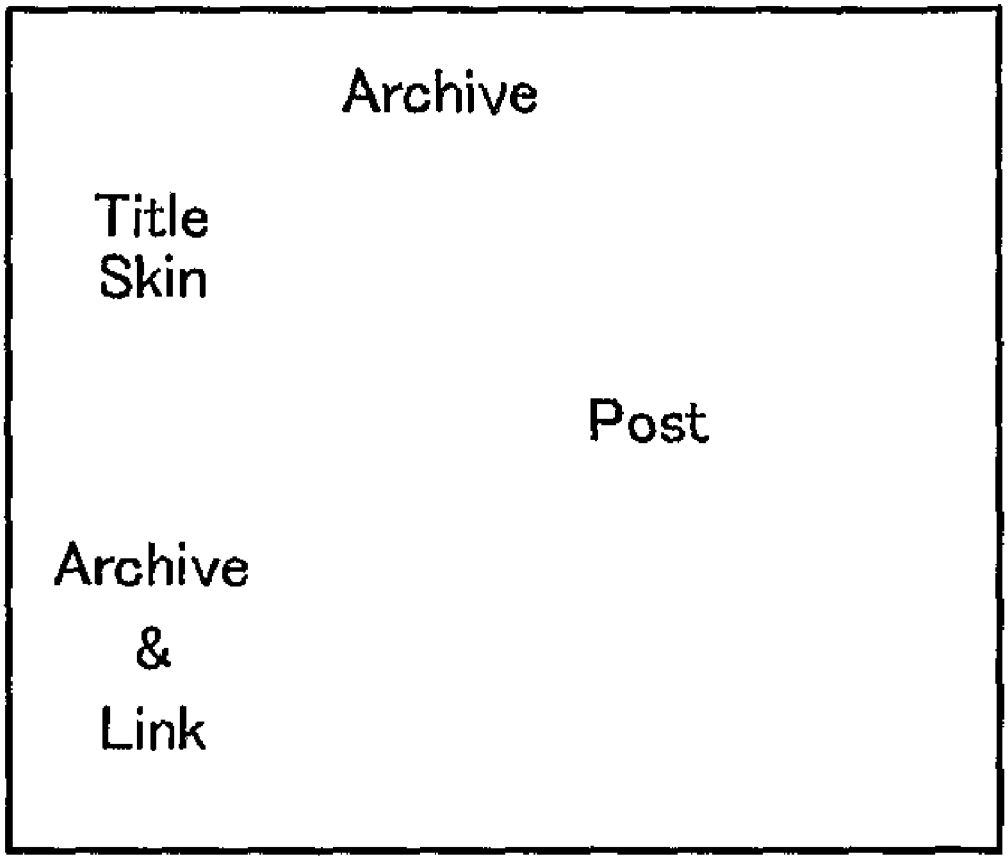

In the case of the mini homepage template shown in FIG. 7, sizes and layouts are controlled to be similar to those of the "homepage" service, which is a personal homepage providing service currently provided by various community service providers to aim at single posts. In this instance, the homepage service represents a service that provides an online space to users and allows the users to manage the online space. Also, since it requires no professional techniques in uploading and managing data, it is easier to manage the homepage service than the general personal homepages.

Positions of the title, archive, and links on the mini homepage template are designed in various manners.

The goods server 500 can have various template designs as well as the above-noted templates, and can store background images and various community configuration items.

For example, when user A accesses the item shop server 300, selects a one-column vertical template (d) and a corresponding background image from among various templates and background images, and buys them, URL information on the storing location of the one-column vertical template (d) and the background image is stored as community configuration item buying information on user A in the item database 400.

In this instance, when user A buys a template and a background image, the item database 400 stores additional buying information as community configuration item buying information in addition to the existing stored information associated with user A.

Next, when user A accesses the community server 700 for providing the blog service to request application of the one-column vertical template (d) and the background image through a menu for resetting blog environments, the community server 700 inquires about URL information on the requested one-column horizontal template (2*d* of FIG. 2) and background image of the bridge server 600 and provides a blog environment based on the URL information of the requested one-column horizontal template (2*d* of FIG. 2) and background image provided by the bridge server 600.

In this instance, the URL information on the requested one-column horizontal template (2*d* of FIG. 2) and background image may indicate an initially-stored file storing location in the goods server 500, or the URL information on the template may indicate a file storing location in the community server 700 when the community server 700 duplicates template information from the goods server 500 and stores the same.

The community server 700 provides a cookie including URL information on the community configuration item to the user terminal 100, and when the user terminal 100 has the cookie at the time of access, the community server 700 generates and provides a web page based on the URL information on the community configuration item stored in the cookie.

Figure 8:
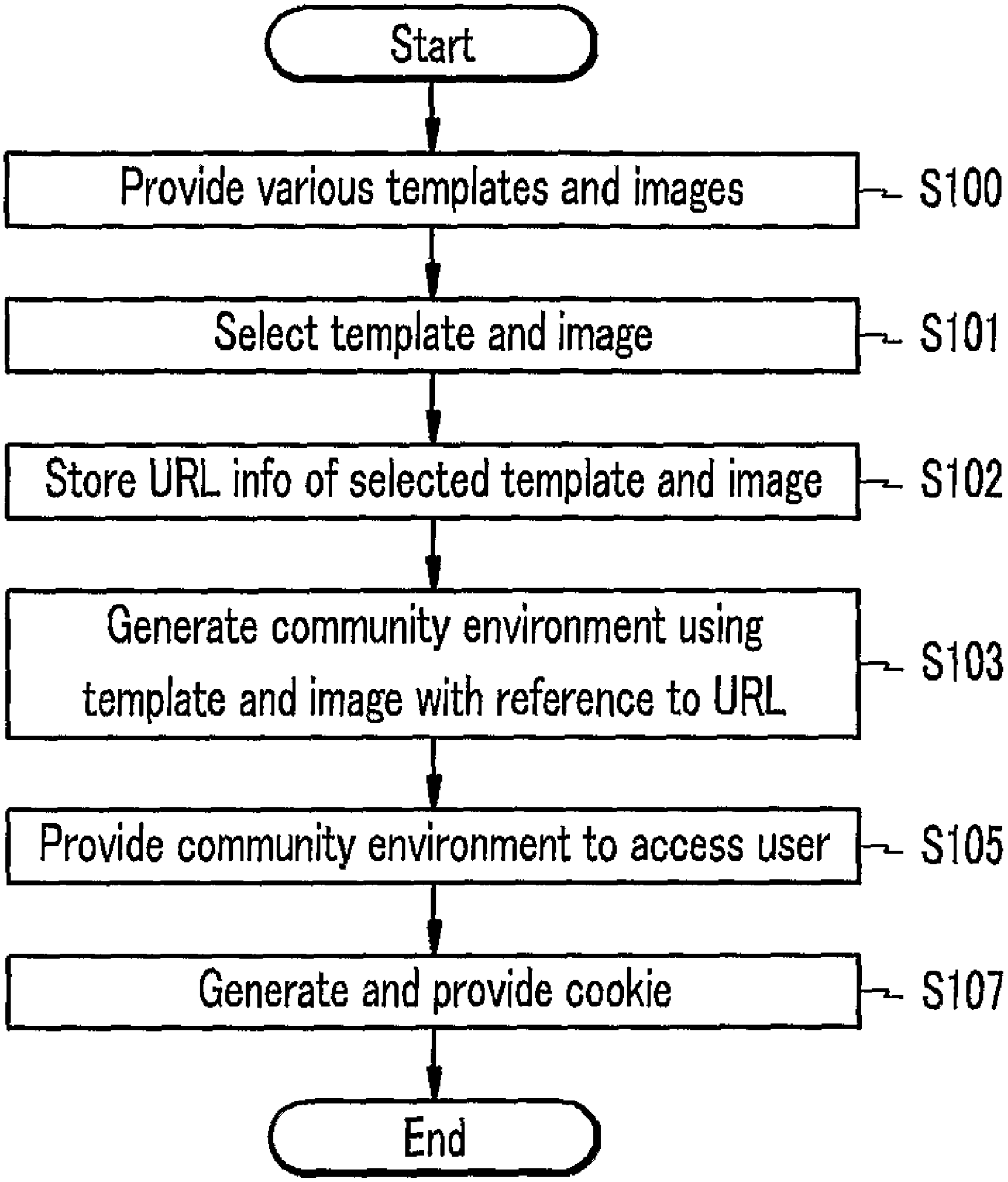
FIG. 8 shows a flowchart for a community providing method according to an embodiment of the present invention.

A community providing method according to the embodiment of the present invention will now be described in detail with reference to FIG. 8.

In step S100, a community configuration item having information on templates and images to be applied to the configuration of various community environments is generated and stored.

In step S101, a user selects one of the various community configuration items provided to the user terminal 100 to specify the desired community configuration item. In this instance, the specification can be performed either in the format of the user's buying the corresponding items or by a simple selection without paying costs.

In step S102, URL information on the specified community configuration items is sorted according to users and is then stored.

For example, when user A selects a one-column vertical template (FIG. 2*d*) and a corresponding background image from among various templates and background images and buys them, the one-column vertical template (FIG. 2*d*) and the corresponding background image are specified, and corresponding URL information is stored as community configuration item buying information associated with user A.

Next, in steps S103 and S105, when a request to apply the specific community configuration item is generated from the user terminal 100, URL information on the corresponding item is inquired and transmitted, and a community web page to which the community configuration item requested based on the URL information is applied is generated and provided.

In this instance, a cookie including URL information on the community configuration item is provided to the user terminal 100 in step S107. When the user terminal has the cookie at the time of access, a community web page is generated and provided based on the URL information on the community configuration item stored in the cookie.

Therefore, the web page is quickly generated and provided since the process of inquiring URL information on the community configuration item for the purpose of generating the community web page each time the user terminal 100 is accessed is omitted.

A community providing method referring to the cookie will now be described in detail with reference to FIG. 9.

Figure 9:
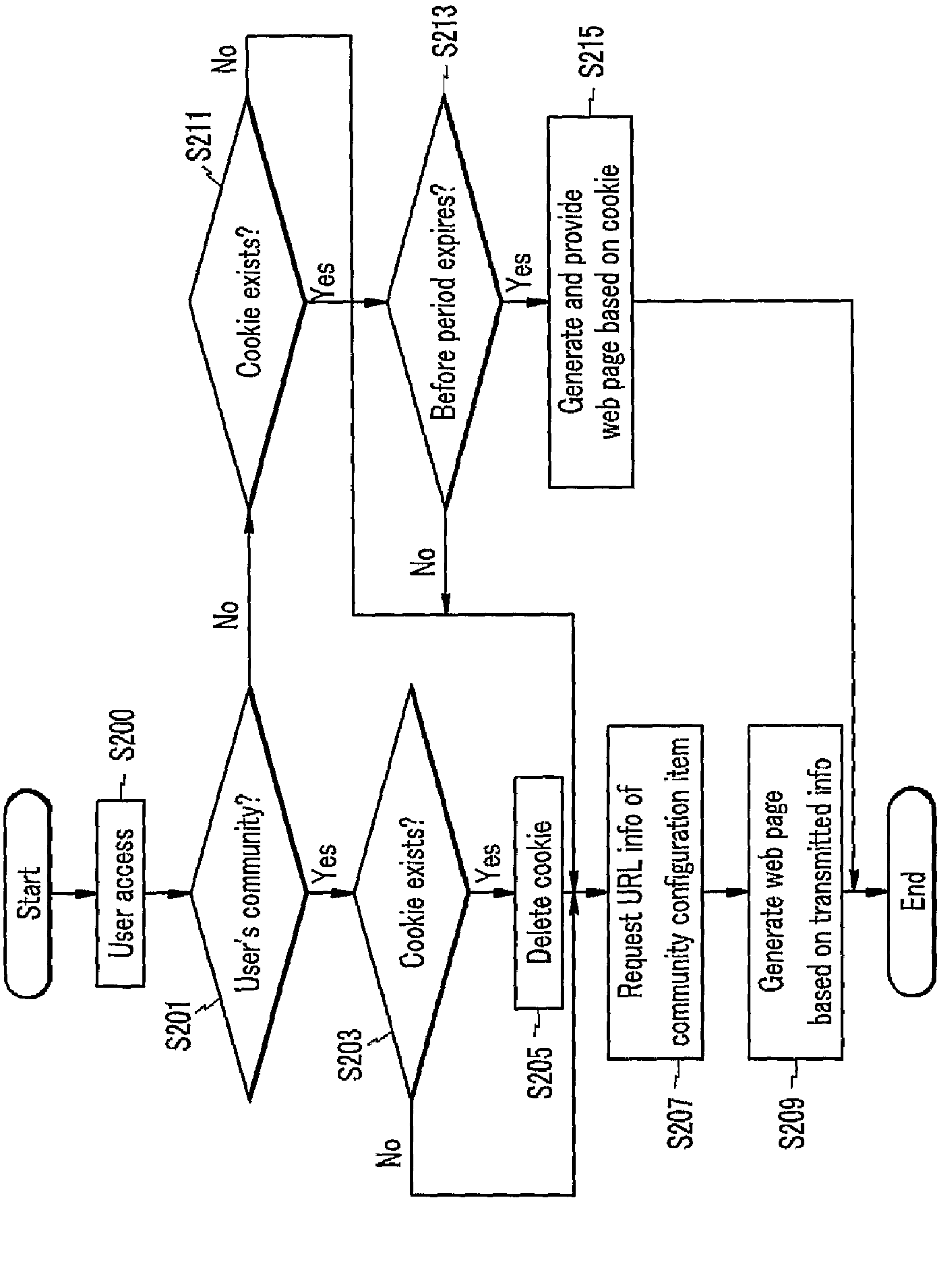
FIG. 9 shows a detailed flowchart for generating and updating cookies according to an embodiment of the present invention.

Referring to FIG. 9, when the user terminal 100 is accessed in step S200 and the user having accessed the community server 700 requests application of a specific community configuration item to the community web page, the existing cookie is eliminated in steps S201, S203, and S205.

Newly setting the community environment by applying the specific community configuration item is allowed for the manager or a host of the corresponding community, which accordingly corresponds to the case in which, for example, a subscriber of a blog service accesses the blog.

In this instance, no cookie for referring to URL information on the community configuration item for generating a community web page exists, and hence, the community server 700 inquires about URL information on the requested community configuration item again in step S207. The community server 700 again generates a community web page to which a new template and a background image are applied based on the URL information on the received community configuration item and provides them to the user terminal 100. In this instance, the community server 700 generates a cookie again based on the URL information and provides the cookie to the user terminal 100 in steps S207 and S209.

For example, when a blog service subscriber accesses his blog, the community server 700 deletes the existing cookie stored in the user terminal 100, and inquires for URL information on the template and the background image again.

That is, when the user accesses his community, the user receives a community web page based not on information stored in the user terminal but rather based on URL information on the community configuration item received again. Therefore, when the user accesses his community, the user can receive community environments to which recent changes are applied in no relation to the cookie information stored in the user terminal 100.

When the user having accessed the community in the previous step S201 is a visitor who does not belong to the community, the community server 700 generates a community web page and provides the same based on the URL information on the community configuration item included in the cookie stored in the user terminal 100 in steps S211, S213, and S215.

Therefore, the visitor cannot receive the new community web page when the cookie stored in the user terminal 100 of the visitor has no URL information on a new template and a background image even though the community accessed by the visitor is established with the new template and the background image by the manager or the host.

The cookie further includes information on a cookie expiration period. Therefore, when the expiration period of the cookie stored in the user terminal 100 is passed in the previous step S213, the community server 700 again inquires about URL information on the community configuration item, and generates and provides a community environment based on the URL information on the received community configuration item in step S207 and S209.

That is, communication traffic provided to the system can be reduced since the community web page is generated and provided to the visitor in advance based on the stored cookie. In this instance, changes of the accessed community environment may not be applied. Therefore, the changes of the community environment may be controlled at regular intervals by establishing a predetermined expiration period for the cookie and controlling the URL information on the community configuration item to be inquired about again when the expiration period has passed.

In this instance, the web page is generated by inquiring about URL information on the community configuration item in steps S207 and S209 when the user terminal 100 has no cookie stored therein.

While this invention has been described in connection with the attached drawings, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to embodiments of the present invention, various community environments established by a user are provided, differing from the existing formalized community environment.

That is, various community environments are provided by modifying the whole layout through application of various templates in addition to changes in the background images for the community environment.

As a result, users' interest is increased and service usage is improved through the provision of the different and various community environments.

The invention claimed is:

1. A community providing system for providing a personalized community environment to user terminals connected to the internet, wherein the community environment allows various users to present information and communicate with other users online, the community providing system comprising:

a goods server having a storage device operable to store community configuration items including at least one of a template and at least one of a background image of the community environment;

an item shop server operable to allow a user to select at least one of the community configuration items via a user terminal connected to the internet and comprising a display device;

an item database operable to sort and store URL information, said URL information indicating a memory location on a storage device containing the at least one of the community configuration items selected by the user;

a bridge server operable to deliver the URL information from the item database to a community server for generating a personalized community web page when the user terminal requests the bridge server to apply the at least one of the community configuration items selected by the user to the community environment; and the community server operable to generate the personalized community web page to which the at least one of the community configuration items selected by the user is applied to information content supplied by the community server and operable to provide the generated personalized community web page to the user terminal to be displayed on the user terminal display device based on the URL information on the at least one of the community configuration items selected by the user and delivered by the bridge server, wherein the community server provides to the user terminal a cookie including the URL information on the at least one of the community configuration items selected by the user, the community server determines whether the user is a host of the community environment or a visitor of the community environment, when the user is determined a host the community server deletes, when present, the cookie as previously stored on the user terminal and again receives the URL information on the at least one of the community configuration items selected by the user from the bridge server to provide the personalized community web page based on the received URL information, and when the user is a visitor and the cookie is present on the user terminal, the community server provides the personalized community web page based on the URL information on the at least one of the community configuration items selected by the user stored in the cookie.

2. The community providing system of claim 1, wherein the cookie further comprises a cookie expiration period information, and the community server again receives the URL information on the at least one of the community configuration items selected by the user from the bridge server when the cookie expiration period has passed.

3. The community providing system of claim 1, wherein the item shop server is operable to allow a user to select at least one of the community configuration items by allowing a user to purchase the at least one of the community configuration items, and wherein the at least one of the community configuration items purchased by the user comprises a template file and a background image file, the template file is duplicated from the goods server and is stored in a storage device of the community server, URL information on the template file indicates a memory location in the storage device of the community server at which the template file is stored, and URL information on the background image file indicates a memory location in a storage device of the goods server at which the background image file is stored.

4. The community providing system of claim 1, wherein the community server comprises a blog server and wherein the information content supplied by the community server comprises blog posts.

5. The community providing system of claim 4, wherein the community configuration items comprise at least one template operable to be used for configuration of at least one blog.

6. A community providing method for providing a customized community environment to user terminals connected through a network, wherein the community environment allows various users to present information and communicate with others online, the method comprising:

storing community configuration items including a template and a background image of the community environment in a storage device;

allowing a user to select at least one of the community configuration items;

sorting and storing URL information indicating a memory location on a storage device containing the at least one of the community configuration items selected by the user;

delivering the URL information on the at least one of the community configuration items selected by the user to a community server for generating a customized community web page when a request to apply the at least one of the community configuration items selected by the user is provided by a user terminal having a display device;

generating and providing the customized community web page to be displayed on the display device of the user terminal to which the at least one of the community configuration items selected by the user is applied to information content from a community server based on the delivered URL information on the at least one of the community configuration items selected by the user;

providing a cookie including the URL information on the at least one of the community configuration items selected by the user to the user terminal;

determining whether the user is a host of the community environment or a visitor of the community environment;

when the user is determined a host, deleting the cookie provided to the user terminal and receiving the URL information on the at least one of the community configuration items selected by the user to provide the customized community web page based on the received URL information; and when the user is determined a visitor, providing the customized community web page based on the URL information on the at least one of the community configuration items selected by the user stored in the provided cookie.

7. The community providing method of claim 6, wherein the cookie further comprises cookie expiration period information, and the method comprises again receiving the URL information on the at least one of the community configuration items selected by the user from a bridge server and providing a community environment when the cookie expiration period has passed.

8. The community providing method of claim 6, wherein the community configuration item comprises a template file and a background image file, the template file is duplicated from a storage device in a goods server and is stored in a storage device of the community server, URL information on the template file indicates a memory location in the storage device of the community server at which the template file is stored, and URL information on the background image file indicates a memory location in the storage device of the goods server at which the background image file is stored.

9. A tangible computer-readable storage medium storing computer-executable instructions operable to perform the method recited in claim 6.

10. The tangible computer-readable storage medium of claim 9, wherein the at least one of the community configuration items selected by the user comprises a template file and a background image file, the template file is duplicated from a goods server and is stored in a community server, URL information on the template file indicates a location in the community server at which the template file is stored, and URL information on the background image file indicates a location in the goods server at which the background image file is stored.

* * * * *